United States Patent [19]
Nagano et al.

[11] Patent Number: 6,030,723
[45] Date of Patent: Feb. 29, 2000

[54] LEAD BUSHING AND LEAD STORAGE BATTERY WITH LEAD BUSHING

[75] Inventors: Takuji Nagano; Kiyoshi Ano, both of Osaka, Japan

[73] Assignee: Miyagawa Kasei Industry Co., Ltd., Osaka, Japan

[21] Appl. No.: 08/944,052

[22] Filed: Sep. 19, 1997

[30] Foreign Application Priority Data

May 22, 1997 [JP] Japan ..................................... 9-132312

[51] Int. Cl.[7] ..................................... H01M 2/30

[52] U.S. Cl. ........................... 429/181; 429/178; 429/182

[58] Field of Search ..................................... 429/178, 181, 429/182, 225

[56] References Cited

U.S. PATENT DOCUMENTS

| | | |
|---|---|---|
| 738,718 | 9/1903 | Fiedler . |
| 2,416,651 | 2/1947 | Smyth . |
| 2,621,222 | 12/1952 | Wirth . |
| 3,380,857 | 4/1968 | Bilhorn . |
| 4,776,197 | 10/1988 | Scott . |
| 4,859,547 | 8/1989 | Adams et al. ........................... 429/121 |
| 5,478,981 | 12/1995 | Farmer et al. ......................... 219/86.1 |
| 5,626,984 | 5/1997 | Albini ..................................... 429/178 |

*Primary Examiner*—Maria Nuzzolillo
*Assistant Examiner*—Carol Chaney
*Attorney, Agent, or Firm*—W. F. Fasse; W. G. Fasse

[57] ABSTRACT

A lead bushing (1) is mounted on a terminal post (7) in a terminal socket (6a) of a storage battery top wall (6). The lead bushing (1) is a hollow tube (2) that is completely closed at one end by an end wall (3), whereby external welding of the terminal post (7) to the bushing is avoided.

7 Claims, 5 Drawing Sheets

LEAD BUSHING AND LEAD STORAGE BATTERY WITH LEAD BUSHING

FIELD OF THE INVENTION

The present invention relates to a structure of a lead bushing for mounting in a top wall of a lead storage battery casing and to a lead storage battery with such a lead bushing.

DESCRIPTION OF THE BACKGROUND ART

Lead storage batteries are widely known. Such lead storage batteries generally include a battery casing enclosing electrode plates and terminal posts projecting through a casing top wall that closes the top of the battery casing. A lead bushing for enclosing the terminal posts is generally mounted on the battery casing top wall.

FIG. 7 shows an example of a conventional lead bushing 1 including a tube 2 and a plurality of ring protrusions 4 around the lower end of tube 2 which is hollow and has an opening 9 in the upper tube end. The lower end of the tube 2 is also open.

FIG. 8 shows the lead bushing 1 shown in FIG. 7 when it is mounted in a battery casing top wall 6 of a lead storage battery. The battery casing top wall 6 has a terminal socket 6a in which the lead bushing 1 is inserted. The plurality of ring protrusions 4 on the outer periphery of the lead bushing 1 effectively cooperate with respective radially inwardly facing ring projections in the terminal socket 6a for preventing leakage of electrolyte. A terminal post 7 is inserted into the lead bushing 1 and the upper ends of the terminal post 7 and lead bushing 1 are electrically connected by a welded portion 2a.

FIG. 9 shows the step of welding the lead bushing 1 to the terminal post 7. A jig 10 required for the welding step is placed around the outer periphery of the lead bushing 1. Then, the upper ends of the terminal post 7 and of the lead bushing 1 are welded together by a burner 11 or the like.

However, lead storage batteries have different sizes and a large lead storage battery with large terminal posts requires large diameter lead bushings 1. The welding is performed manually which is not efficient. In addition, welding as such is difficult. Furthermore, the above mentioned welding can disadvantageously produce an unexpected alloy in the welded portion 2a, which alloy may cause a corrosion problem or the like.

SUMMARY OF THE INVENTION

The present invention was made to solve the aforementioned problem. It is an object of the present invention to provide a lead bushing which does not require external welding of the lead bushing to the terminal post, and a lead storage battery with the lead bushing.

A lead bushing according to the present invention is mounted in a battery casing top wall of a lead storage battery and completely encloses the respective battery terminal post. The present lead bushing includes a tube with a blind hole that is open at one end but completely closed at the opposite end by a tube end wall. The blind hole extends entirely through the tube to the end wall.

Thus, simply fitting the lead bushing onto the upper end of the respective terminal post fully encloses the upper end of the terminal post including its outer end face by the integrally formed tube end wall of the lead bushing. As a result, the upper end of the terminal post and of the lead bushing need not be welded as in the conventional example, whereby the aforementioned problems caused by the external welding have been eliminated. Fitting the lead bushing according to the present invention onto the upper end of the terminal post can be accomplished simply by choosing approximately the same size for the inner diameter of the lead bushing and for the outer diameter of the terminal post for example, and forcing the upper end of the terminal post into the lead bushing. The efficiency in connecting the terminal post to the lead bushing has thus been increased. Further, an unexpected alloy is not produced between the terminal post and the lead bushing, enhancing the reliability of a connecting portion between the terminal post and the lead bushing.

A lead storage battery according to the present invention is provided with a lead bushing for receiving and completely covering a respective terminal post. The lead bushing includes a tube having an outer end completely closed by the above mentioned tube end wall. Fitting the terminal post into the lead bushing so that the upper end of the post is fully covered and enclosed by the tube and its end wall provides a reliable electrical contact between the lead bushing and the terminal post. It is noted that the above mentioned term "fitting" is intended to include the cases in which the lead bushing is applied to the terminal post by an interference fit and by clearance fit for using an electrically conducting adhesive.

As in the foregoing, the lead storage battery according to the present invention is provided with the above mentioned lead bushing mounted in the battery casing top wall. As a result, the connection between the terminal post and the lead bushing is readily achieved during assembly of the battery and the reliability of the lead storage battery is enhanced especially in the connecting portion between the terminal post and the lead bushing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention and a modification thereof will now be described with reference to FIGS. 1 to 6.

Figure 1:
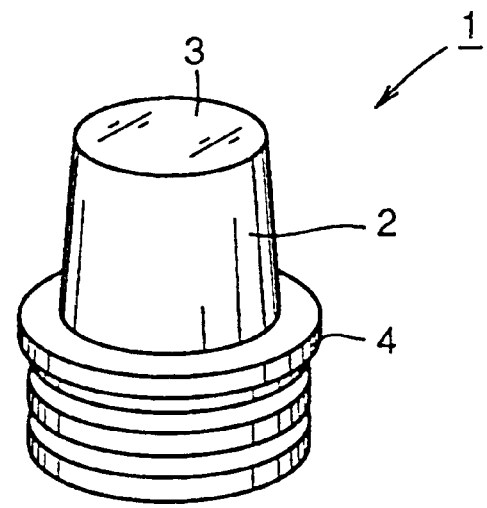
FIG. 1 is a perspective view showing a lead bushing without any welding in accordance with an embodiment of the present invention.

With reference to FIG. 1, lead bushing 1 includes a tube 2 and an end wall 3 closing completely one end of tube 2. A plurality of annular protrusions 4 surround the other end of the tube 2 for preventing leakage of electrolyte. It is noted that an opening or hole not seen in FIG. 1 for receiving a terminal post is formed along the length of tube 2, except for the closed end wall 3.

The above mentioned end wall 3 completely closes the upper end of tube 2. The end wall 3 is formed of the same material as that of which the tube 2 is made.

Figure 2:
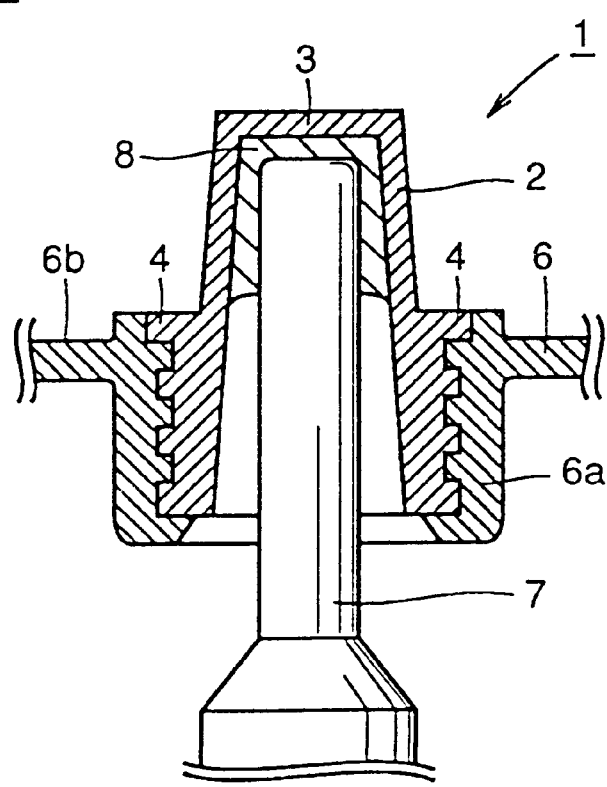
FIG. 2 is a cross-sectional view showing the lead bushing of FIG. 1 as it is mounted on a battery casing top wall for a lead storage battery.

FIG. 2 shows the lead bushing 1 shown in FIG. 1 as it is mounted on a battery casing top wall 6. The lead bushing 1 is inserted into a terminal socket 6a formed in the battery casing top wall 6 of the lead storage battery. The upper end of a terminal post 7 is inserted into the lead bushing 1 and the upper end is connected to the lead bushing 1 by a conductive adhesive 8.

As shown in FIG. 2, the end wall 3 of the lead bushing 1 completely closes the upper end of the tube 2 and extends in a direction which is parallel to a top surface 6b of the battery casing top wall 6 of the lead storage battery. The end wall 3 is integrally formed with tube 2 and fully covers the upper end of the terminal post 7 and enables the connection of the lead bushing 1 and the terminal post 7 by using a conductive adhesive 8 or the like, as mentioned above. The need for external welding has been eliminated. Any problems caused heretofore by external welding have been avoided.

A modification of the above mentioned embodiment 1 will now be described with reference to FIGS. 3 to 6.

Figure 3:
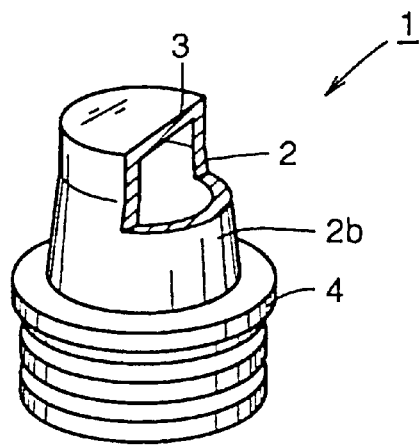
FIG. 3 is a partially sectional perspective view showing a modification of the lead bushing of FIG. 1.

As shown in FIG. 3, the tube 2 forming the lead bushing 1 has a tapered portion 2b at its lower end. The tapered portion 2b extends radially outwardly from a prescribed position. Such a tapered portion 2b is provided for the following purposes.

Figure 4:
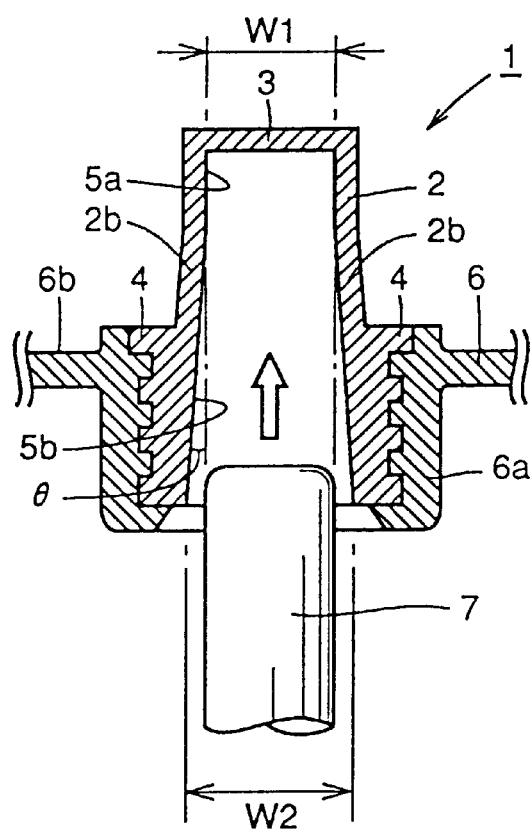
FIG. 4 is a cross-sectional view showing a terminal post to be inserted into the lead bushing of FIG. 3.

FIG. 4 shows that the lead bushing 1 of FIG. 3 is mounted on a battery casing top wall 6 and the upper end of the terminal post 7 is inserted into the lead bushing 1, whereby the tapering facilitates the insertion. With reference to FIG. 4, the provision of the above mentioned tapered portion 2b allows setting of the size of an inner diameter W2 at the lower end of the tube 2, regardless of the size of an inner diameter W1 at the upper end of tube 2.

As a result, a value which is about the same as or less than the diameter of terminal post 7 can be selected for the inner diameter W1, while a relatively large value can be selected for the inner diameter W2 to facilitate the insertion of the terminal post 7 into the lead bushing 1. The resulting tapering ensures that the terminal post 7 can be inserted into the lead bushing 1 even if the positions of the lead bushing 1 and of the terminal post 7 are slightly displaced relative to each other.

It is noted that the above mentioned value for the inner diameter W2 of the taper entrance can be controlled by suitably adjusting a value of an angle θ formed by an inner surface 5b of the tapered portion 2b and a tangent to an inner surface 5a of a straight portion of the tube 2 that has a uniform diameter W2 above the tapered portion 5b.

Figure 5:
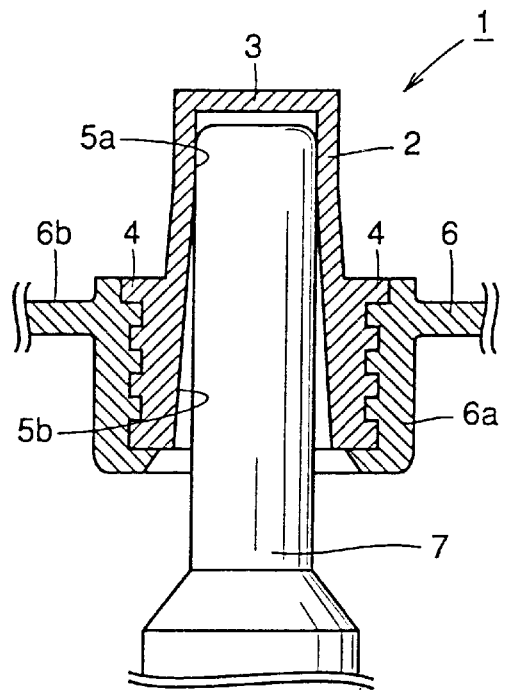
FIG. 5 is a cross-sectional view showing the terminal post after it is inserted into the lead bushing of FIG. 3.

With reference to FIG. 5, the terminal post 7 is inserted into the lead bushing 1 in a direction indicated by an arrow shown in FIG. 4. This allows the inner surface 5a of the straight end portion of the tube 2 to abut against the outer surface of the upper end of the terminal post 7. As a result, the lead bushing 1 and the terminal post 7 are electrically connected to each other.

Figure 6:
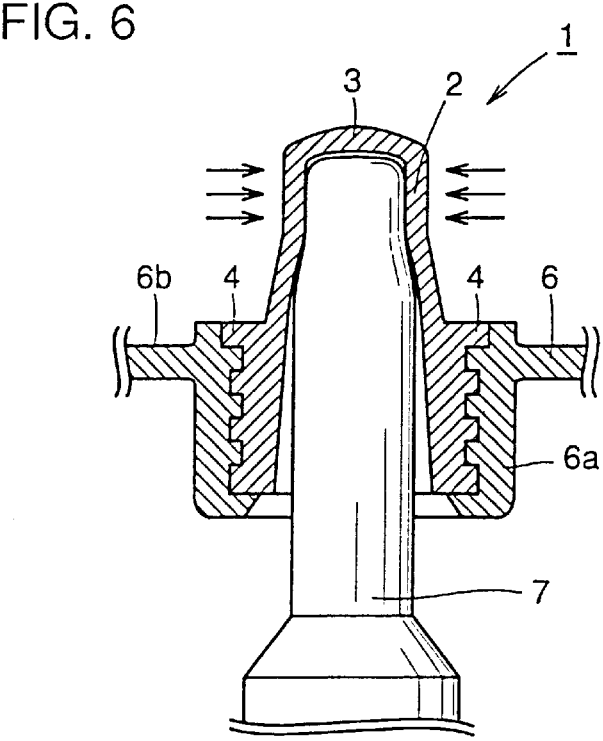
FIG. 6 is a cross-sectional view showing the lead bushing of FIG. 5 with external force applied to the outer periphery thereof.
Figure 7:
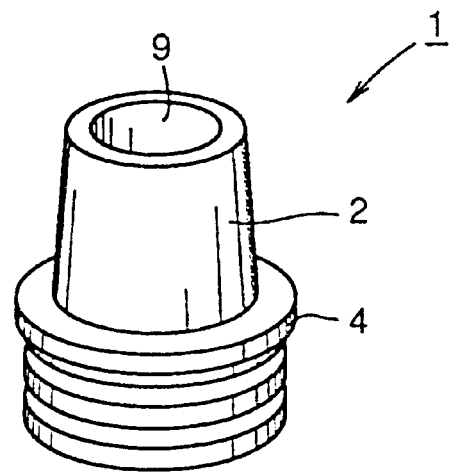
FIG. 7 is a perspective view showing an example of a conventional lead bushing requiring welding.
Figure 8:
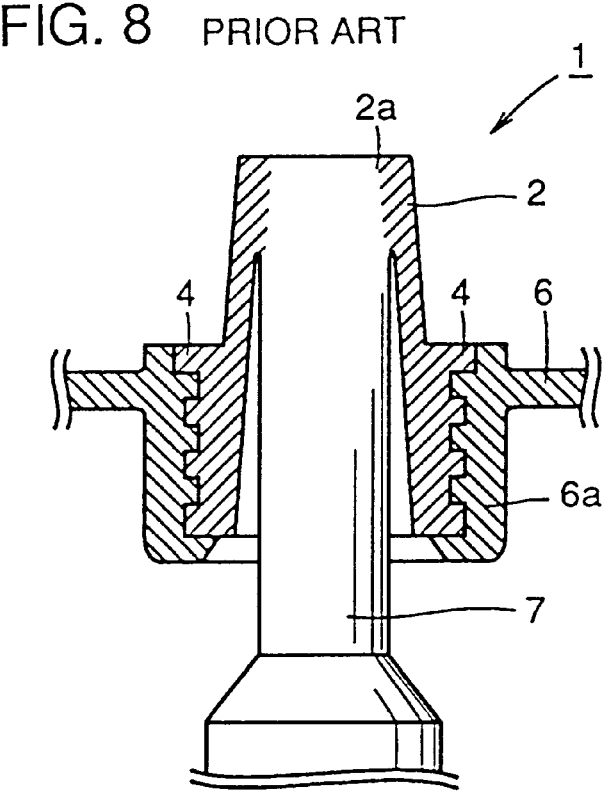
FIG. 8 is a cross-sectional view showing the lead bushing of FIG. 7 as it is mounted on a battery casing top wall for a lead storage battery.
Figure 9:
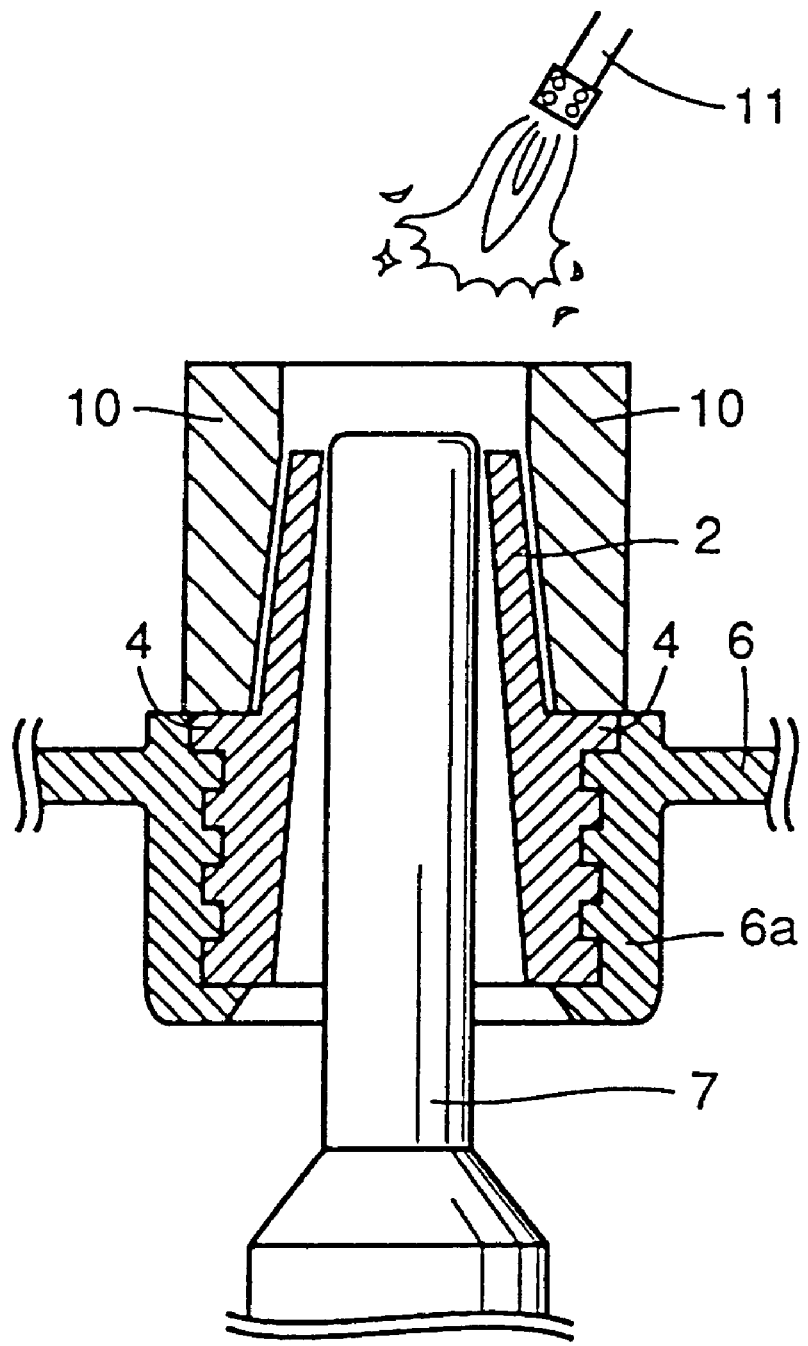
FIG. 9 is a cross-sectional view showing the welding of the lead bushing shown in FIG. 7 to the terminal post.

It is noted that the tightness of the connection between the upper end of the terminal post 7 and the lead bushing 1 can be increased by applying external forces to the outer periphery of the lead bushing 1 shown in FIG. 5 from the directions indicated by arrows, as shown in FIG. 6. The resulting compression provides a lower contact resistance between the terminal post 7 and the lead bushing 1 than in the case shown in FIG. 5. The lead bushing 1 and the terminal post 7 may also be internally welded together by an application of a high frequency after the terminal post 7 has been inserted into the lead bushing 1, whereby further reduction in contact resistance is achieved without applying any external heat welding.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A lead bushing for mounting on a terminal post in a battery casing top wall (6b), said lead bushing comprising a hollow tube (2) enclosing a blind hole extending the entire inside length of said tube (2), and an end wall (3) completely closing said blind hole at one end of said tube (2), wherein said end wall (3) and said tube (2) are of the same material formed as an integral single piece component.

2. The lead bushing of claim 1, wherein said blind hole in said tube (2) comprises a straight portion (5a) next to said end wall (3) and a tapered portion (5b) between said straight portion (5a) and an open end of said tube (2), and wherein said straight portion of said blind hole has a diameter equal to or smaller than a diameter of said terminal post (7).

3. A lead storage battery comprising a battery casing (6), a top wall (6b) closing said battery casing, a terminal socket (6a) in said top wall (6b), a terminal post (7) passing through said terminal socket (6a), and a lead bushing (1) mounted in said terminal socket (6a) and on said terminal post (7), wherein said lead bushing (1) comprises a hollow tube (2) enclosing a blind hole extending the entire inside length of said tube (2), and an end wall (3) completely closing said blind hole at one end of said tube (2), wherein said end wall (3) and said tube (2) are of the same material formed as an integral single piece component.

4. The lead storage battery of claim 3, further comprising an electrically conductive adhesive (8) bonding said lead bushing (1) to said terminal post (7).

5. The lead storage battery of claim 3, wherein said terminal post (7) is internally welded to said tube (2) and to said end wall (3) to avoid any external welding.

6. A lead storage battery comprising a battery casing, a top wall (6b) closing said battery casing, a terminal socket (6a) in said top wall (6b), a terminal post (7) passing through said terminal socket (6a), and a lead bushing (1) including a hollow tube mounted in said terminal socket (6a) and on said terminal post (7), wherein said hollow tube (2) comprises a straight tube portion (5a), a tube end wall (3) completely closing one end of said straight tube portion (5a), and a tapered tube portion (5b) extending from said straight tube portion to an open end of said hollow tube (2) opposite said tube end wall (3), and wherein an outer surface of said terminal post (7) abuts against an inner surface of said straight tube portion (5a).

7. The lead storage battery of claim 6, wherein said terminal post (7) is force-fitted into said straight tube portion (5a), whereby said straight tube portion (5a) and said terminal post (7) are deformed for an increased tightness between said straight tube portion (5a) and said terminal post (7).

* * * * *